United States Patent [19]

LeBoeuf et al.

[11] Patent Number: 4,568,236
[45] Date of Patent: Feb. 4, 1986

[54] LIFT BED PALLET HIGHWAY TRAILER

[75] Inventors: Eugene A. LeBoeuf, 4075 E. 15th Pl., Gary, Ind. 46403; Leslie A. Weaver, Monticello, Ind.

[73] Assignee: Eugene A. LeBoeuf, Gary, Ind.

[21] Appl. No.: 400,994

[22] Filed: Jul. 23, 1982

[51] Int. Cl.⁴ .............................................. B60P 1/02
[52] U.S. Cl. .................................... 414/495; 414/498
[58] Field of Search ............... 414/495, 498; 254/8 R, 254/8 B, 8 C, 10 R, 10 B, 10 C, 45, 49, 50, 124

[56] References Cited

U.S. PATENT DOCUMENTS

| | | | |
|---|---|---|---|
| 2,596,832 | 5/1952 | Carver et al. | 414/498 X |
| 3,119,503 | 1/1964 | Herpich et al. | 414/495 |
| 3,362,552 | 1/1968 | Thiele | 414/498 X |
| 3,802,006 | 4/1974 | Nelson et al. | 414/495 X |
| 4,050,707 | 9/1977 | Glumac | 414/498 X |
| 4,050,709 | 9/1977 | LeBoeuf | 414/498 X |
| 4,372,514 | 2/1983 | Glumac | 414/498 X |

FOREIGN PATENT DOCUMENTS

| | | | |
|---|---|---|---|
| 2754009 | 6/1978 | Fed. Rep. of Germany | 414/495 |
| 1194746 | 11/1959 | France | 254/10 C |
| WO81/01987 | 7/1981 | PCT Int'l Appl. | 254/8 C |

Primary Examiner—Leslie J. Paperner
Assistant Examiner—Ken Muncy
Attorney, Agent, or Firm—Edward W. Osann, Jr.

[57] ABSTRACT

A tractor drawn lift bed highway trailer for transporting high tonnage loads over the highway, utilizing pallet frame units adapted to be picked up or dropped off quickly without the need for additional equipment or personnel. The trailer has a relatively light, strong main frame; a lift bed adapted to be elevated from lowered loading position forwardly and upwardly into engagement with the gooseneck for additional rigidity during transport; improved protection for the load and the tractor in event of an emergency stop; and improved cornering characteristics.

4 Claims, 14 Drawing Figures

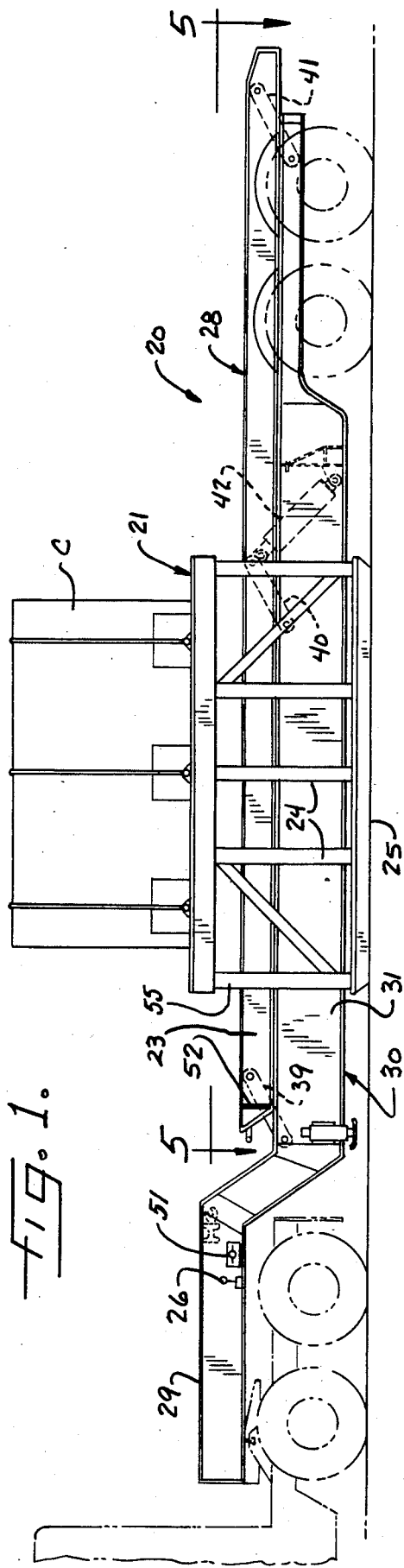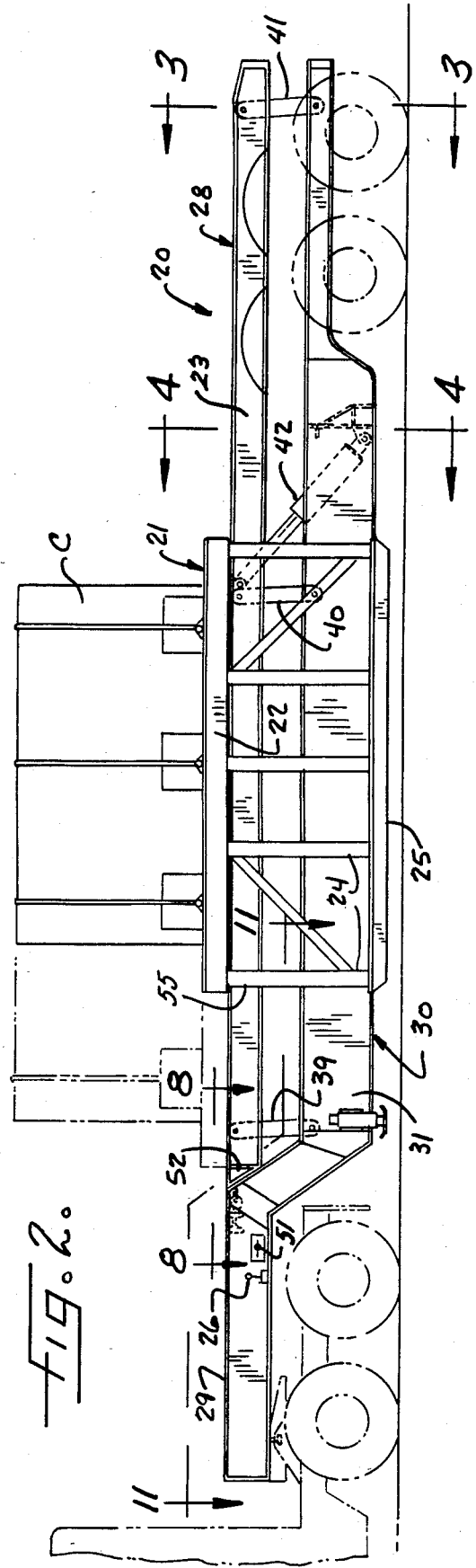

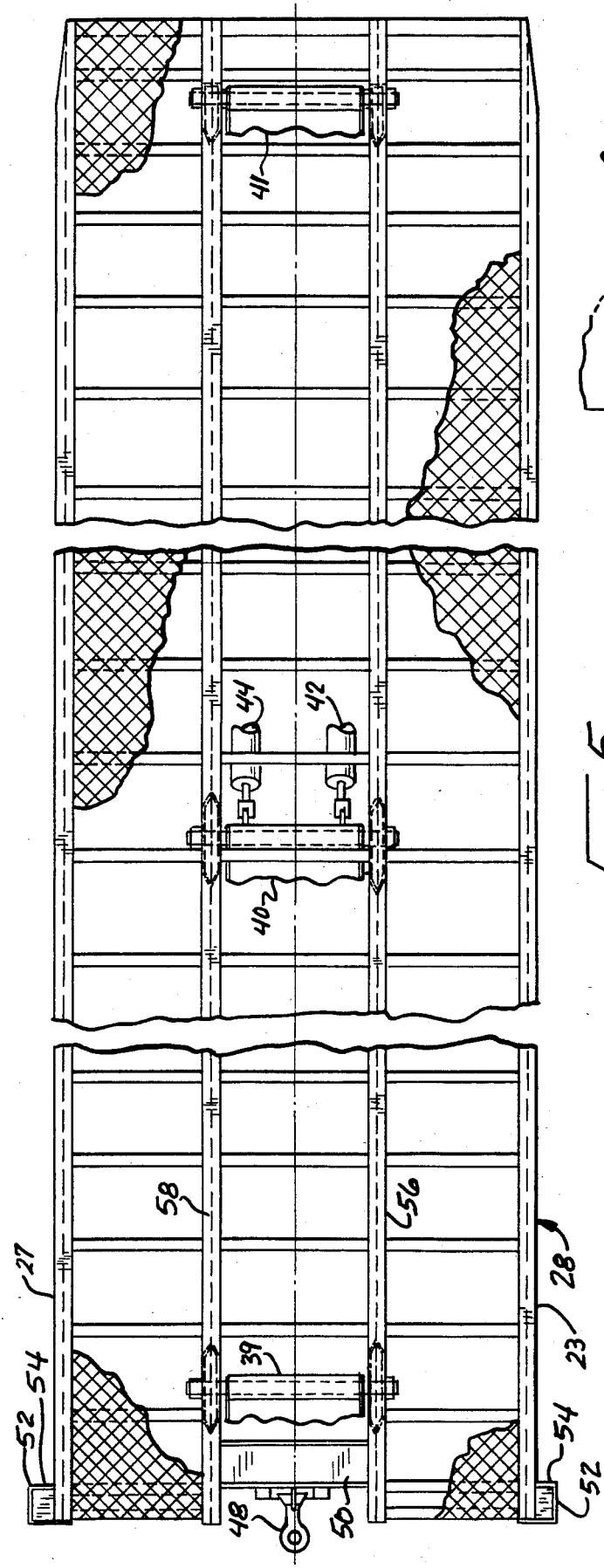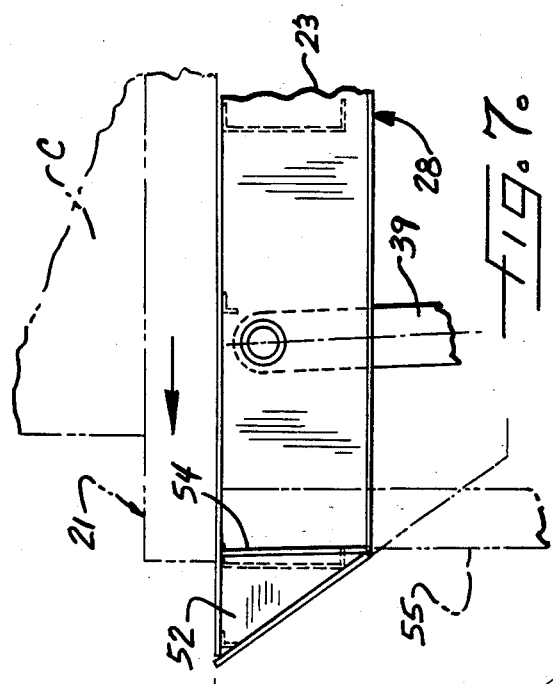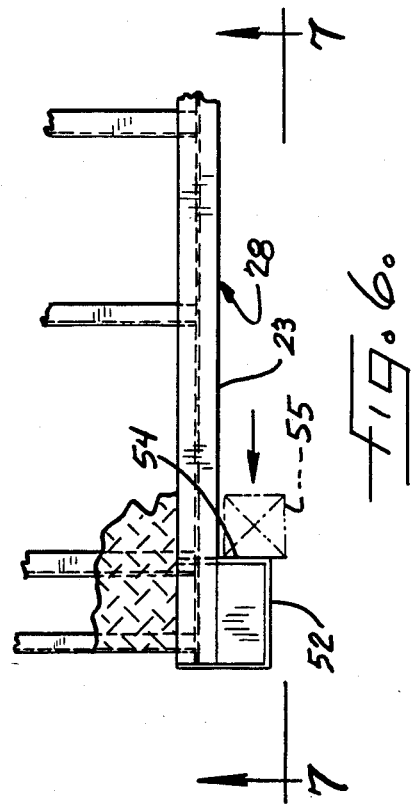

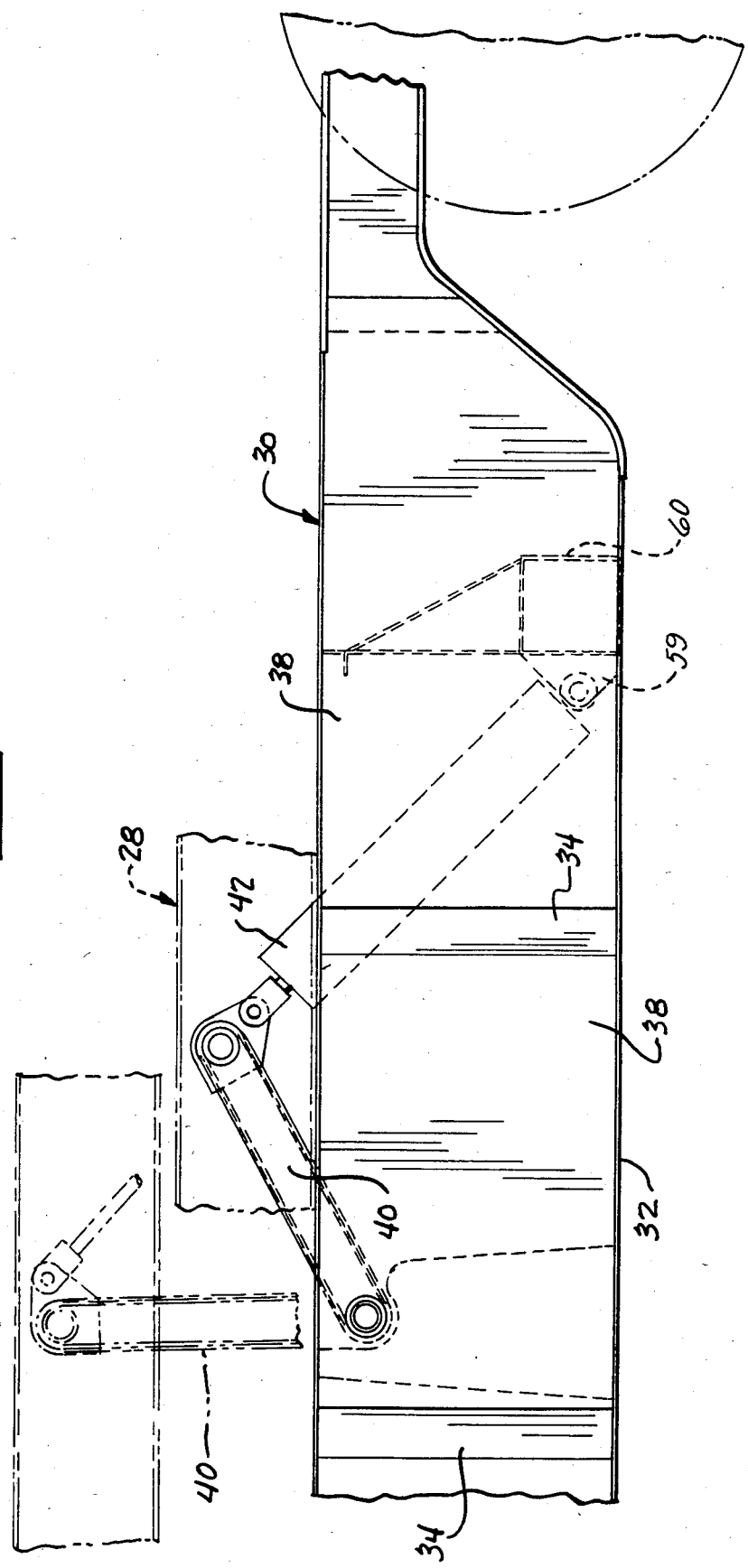

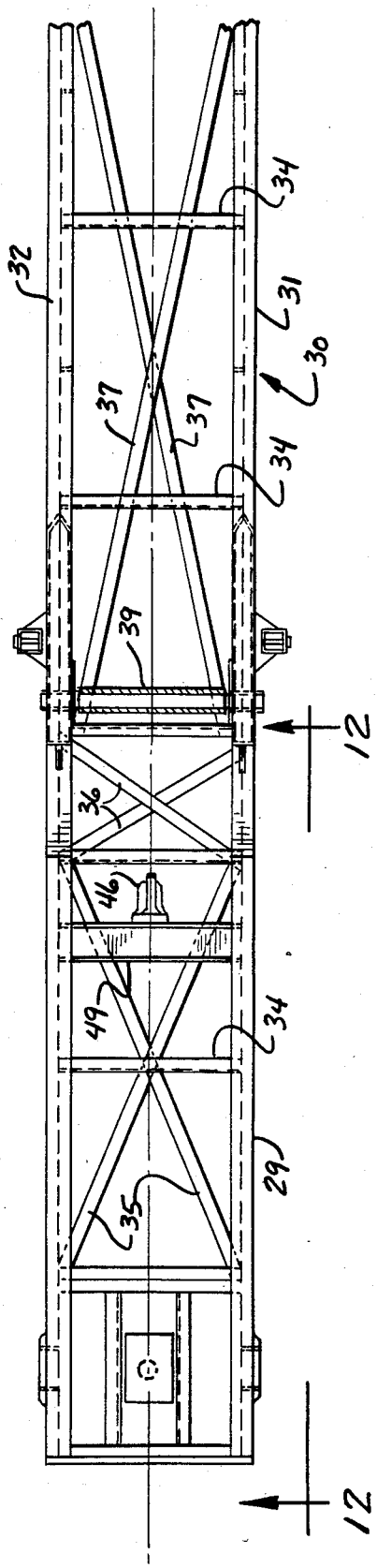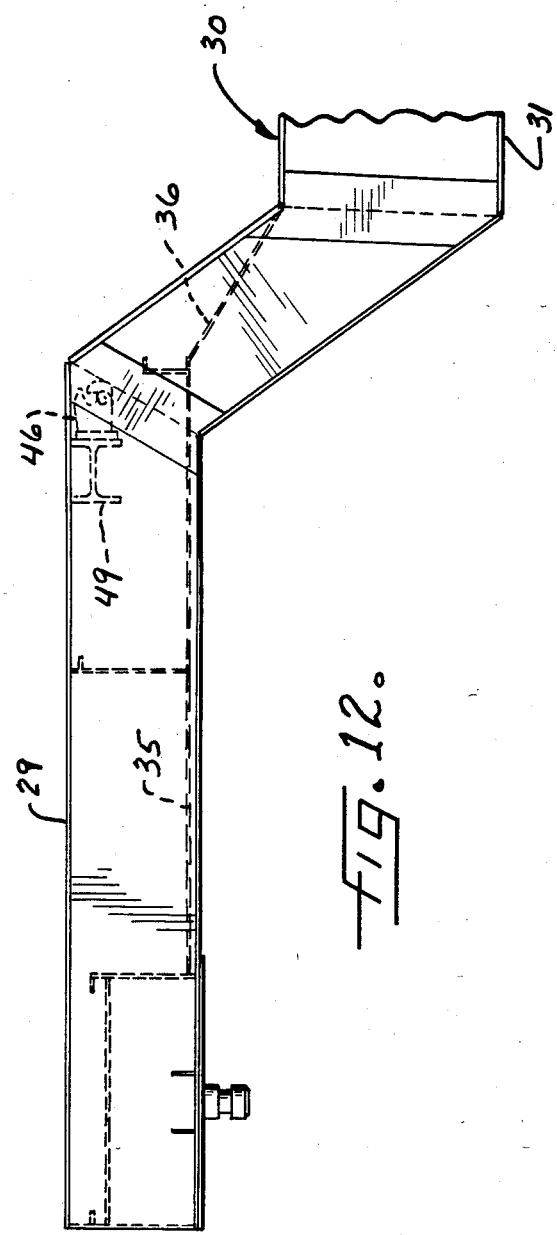

LIFT BED PALLET HIGHWAY TRAILER

BACKGROUND OF THE INVENTION

The present invention relates in general to tractor drawn lift bed trailers for transporting high tonage loads over the highway, utilizing pallet frame units adapted to be picked up or dropped off quickly without the need for additional equipment or personnel. The combination of lift bed trailer and detachable pallet frame units maximizes the availability of the trailer for load carrying and greatly increases the efficiency of the equipment. This invention represents an improvement over the lift bed trailers disclosed in prior U.S. Pat. Nos. 4,061,353 and 4,060,145 issued on the application of Kingman et al., U.S. Pat. No. 4,050,709 issued on the application of Eugene A. LeBoeuf, and co-pending U.S. application Ser. No. 315,437 of Leslie A. Weaver, now U.S. Pat. No. 4,474,359.

SUMMARY OF THE INVENTION

It is an object of the present invention to provide a lift bed highway trailer adapted for use with legged pallet frame units carrying loads on the order of 25 tons and having a relatively light but exceptionally strong frame structure.

Another object of the invention is to provide a lift bed highway trailer of the foregoing type which utilizes the abutting engagement of the gooseneck and lift bed structure in transport position to impart additional rigidity to the gooseneck, lift bed, and adjacent portion of the main frame. A related object is to provide a lift bed trailer having improved cornering characteristics.

A further object of the invention is to provide a lift bed trailer of the character set forth above utilizing a transport locking arrangement which becomes engaged as an incident to elevation of the lift bed to raised transport position.

Another object of the invention is to provide a lift bed trailer of the type noted above including an improved structural arrangement which increases the protection afforded the trailer and tractor in the event of an emergency stop on the highway.

Other objects and advantages will become apparent as the following description proceeds, taken together with the accompanying drawings.

BRIEF DESCRIPTION OF THE DRAWINGS

FIG. 1 is a side elevational view of an illustrative lift bed pallet trailer embodying the present invention, with the lift bed in lowered position and a loaded pallet frame straddling the same while still on the ground;

FIG. 2 is a side elevational view of the illustrative trailer with the lift bed in raised transport position, its transport lock engaged, and the loaded pallet being supported with its legs off the ground with adequate running clearance;

FIG. 5 is a broken horizontal plan view taken in the plane of the line 5—5 in FIG. 1 and illustrating various structural aspects of the trailer lift bed;

FIG. 6 is an enlarged fragmentary plan view of the left hand forward corner of the lift bed illustrating one of the pallet stops in abutting contact with the forward left hand leg of a pallet frame;

FIG. 7 is an enlarged fragmentary elevational view showing a portion of the lift bed illustrated in FIG. 6, taken in the plane of the line 7—7 in FIG. 6;

FIG. 10 is an enlarged fragmentary elevational view of the rearward portion of the trailer frame showing details of the hydraulic actuator mounting and its associated hinge panel;

FIG. 11 is a broken plan view showing the gooseneck structure and adjacent portion of the main frame, taken in the plane of the line 11—11 in FIG. 2;

FIG. 12 is an enlarged fragmentary elevational view of the goose neck, taken in the plane of the line 12—12 in FIG. 11.

Figure 3:
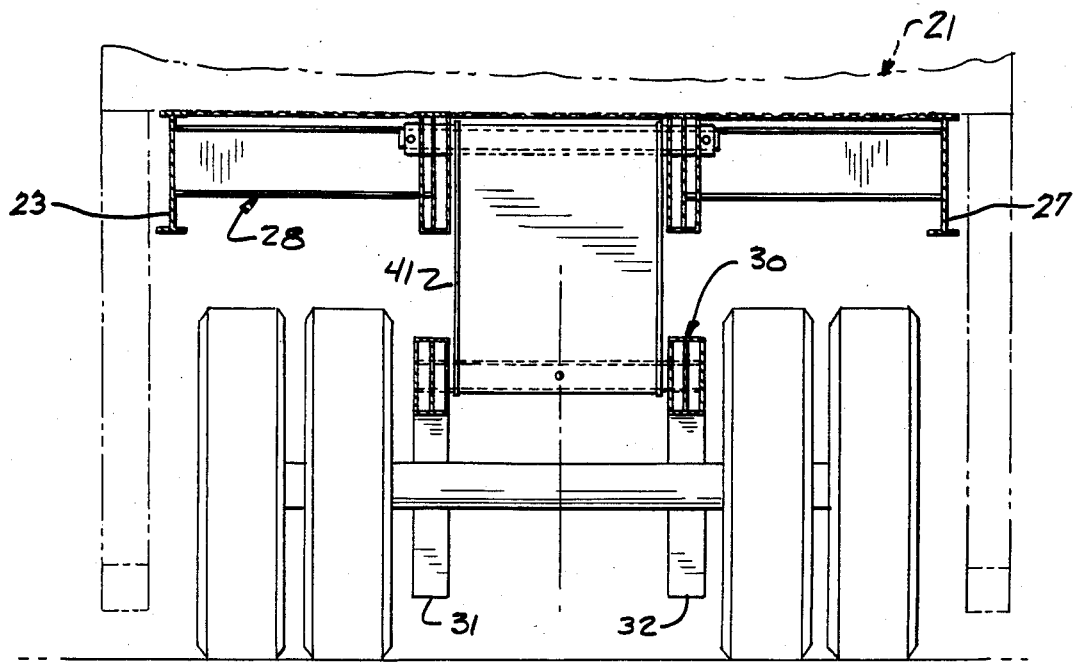
FIGS. 3 and 4 are enlarged vertical sectional views taken transversely through the rearward portion of the trailer shown in FIG. 2 in the planes of the lines 3—3 and 4—4, respectively.

While the invention is susceptible of various modifications and alternative constructions, a certain preferred embodiment has been shown in the drawings and will be described below in considerable detail. It should be understood, however, that there is no intention to limit the invention to the specific form described but, on the contrary, the intention is to cover all modifications, alternative constructions and equivalents falling within the scope of the appended claims.

DETAILED DESCRIPTION

Referring further to FIGS. 1 and 2, the invention is there exemplified in a lift bed trailer 20 of the tractor drawn type. The trailer 20 is adapted to transport loads through the use of one or more pallet frame units 21. Each pallet frame unit comprises a raised platform 22 with depending legs 24 and a ground engaging skid 25. The pallet frame unit in this instance happens to be loaded with a large coil C of heavy gauge steel. The loaded pallet frame unit is adapted to straddle the trailer which freely moves under the platform 22 during loading. The tractor operator then operates the lift bed control lever 26 elevating the lift bed 28 and the loaded pallet frame unit 21 clear of the ground for transport over the highway. At the destination, the lift bed 28 and pallet frame unit 21 are lowered until the latter engages the ground, whereupon the trailer freely moves out from under the platform 22 and is ready for another trip.

As indicated earlier herein, the frame structure or main bed 30 of the trailer 20 is of lightweight construction but has sufficient strength to carry loads on the order of 25 tons most effectively (FIGS. 1, 2, 10-12). For the purpose of minimizing the weight while enhancing the strength of the main frame 30, resort is had to two longitudinal stringers 31, 32 which extend the entire length of the trailer including the gooseneck. The stringers 31, 32 in this instance are of I-beam configuration and are laterally spaced but situated entirely inboard of the trailer and tractor wheels. The medial portion of the main frame stringers 31, 32 between the gooseneck 29 and the trailer wheels utilizes a relatively deep web section extending from the level of the top of the tractor frame to the ground clearance level of the trailer. This section is stiffened by shallow channels 34 disposed transversely at intervals along its length. The rearward portion of each of the stringers 31, 32 is about one third the depth of the medial portion. The gooseneck 29 is approximately two thirds the depth of the medial portion.

In addition to the transverse channels, the gooseneck and adjacent portion of the main frame are stiffened by means of cross member lacing (FIGS. 11 and 12). This lacing comprising cross members 35 and 36, is disposed adjacent the bottom flange of the gooseneck and then at the inclined portion of the gooseneck crosses over to the top flange of the adjacent main frame I-beams. Additional lacing involving cross members 37, continues for a distance rearwardly of the transition between the horizontal portion of the gooseneck and the adjacent deep section medial portion 38 of the main frame. This additional rigidity improves the cornering characteristics of the trailer as well as the strength at the main frame.

Provision is made in the trailer 20 for enhancing the rigidity of the entire main frame and lift frame structure when in transport position. This is accomplished in part by locating the hinge panels 39–41 and the hydraulic lifting actuators 42, 44 in such a manner that the lift bed 28 will swing in a forwardly and upwardly inclined path as it travels toward transport position substantially at the crest of the inclined path. By the time the forward end 45 of the lift bed reaches its fully raised transport position, the hinge panels have been swung slightly past their vertical dead center positions and the forward end of the lift bed is abutting solidly against the downwardly inclined portion of the gooseneck. Solid abutting engagement is facilitated by undercutting the forward end 45 of the lift bed at an angle corresponding to the downward incline of the gooseneck.

Provision is made for locking the lift bed 28 in raised transport position as an incident to its arrival in that position. This is accomplished by means of a pintle hook and eye mechanism 46, 48 (FIGS. 1; 2, line 8—8; 8; 9). In the present instance, the spring loaded pintle hook 46 is mounted on the flange of an I-beam 49 extending transversely of the gooseneck. Cooperating eye 48 is also mounted on a transverse I-beam 50 in the forward part of the lift bed. As the eye engages the pintle hook, the loading spring of the pintle hook is triggered and the hook closes to hold the eye captive in relatively snug engagement. Thus, the arrangement is self latching so that when the lift bed 28 reaches its fully raised position the eye 48 has completely engaged the pintle hook 46. A spring locking dog 51a is provided in the hook so that when it is desired to lower the lift bed, the operator merely has to pull a cord release 51, 51b and this trips the locking dog. The lift bed may then be lowered without any problem.

By reason of the construction just described, it will be appreciated that the rigidity of the gooseneck, adjacent portion of the main frame, the lift bed, and the two forward hinge panels of the trailer is greatly enhanced when the lift bed is secured in the raised transport position. This result is obtained, whether or not the trailer is loaded.

With the lift bed 28 and its loaded pallet frame 21 in raised transport position, there is sufficient friction between the pallet frame and the lift bed under ordinary stopping conditions to preclude forward sliding of the loaded pallet. Under emergency stop conditions, however, it is possible for the loaded pallet to slide forwardly along the lift bed toward the gooseneck. If the stop is severe enough, the loaded pallet conceivably could slide onto the gooseneck and possibly into the tractor cab.

To protect the trailer and tractor against a sliding pallet under emergency stop conditions, the forward end of the lift bed is provided with a pair of substantial and particularly rugged pallet stops 52. Each such stop 52 has the general form of an inverted right triangular prism. The stops are situated one on either side of the lift bed, each being fixed to the outer side of a respective one of the outer stringers 23, 27 of the lift bed. The stringers 23, 27 may be of I-beam configuration. The foreward face of each stop 52 is coplanar with the undercut forward end 45 of the lift bed. The rearward face of each stop 52 is formed as a vertical abutment 54 extending outwardly from the lift bed stringer 23 or 27 on which it is mounted and has a top surface generally flush with the upper surface of the stringer. The rearwardly facing vertical abutment 54 is so dimensioned as to intercept the forward leg 55 of a pallet frame unit 21 in the event that the latter should slide toward the gooseneck. In the unlikely event that the forward legs 55 of the pallet frame should fail due to the weight of the load and/or the speed of the vehicle when the brakes are applied, the next post rearward on either side of the pallet frame would take the load and the stops 52 would still be effective to arrest relative motion of the pallet frame 21 along the lift bed.

Figure 4:
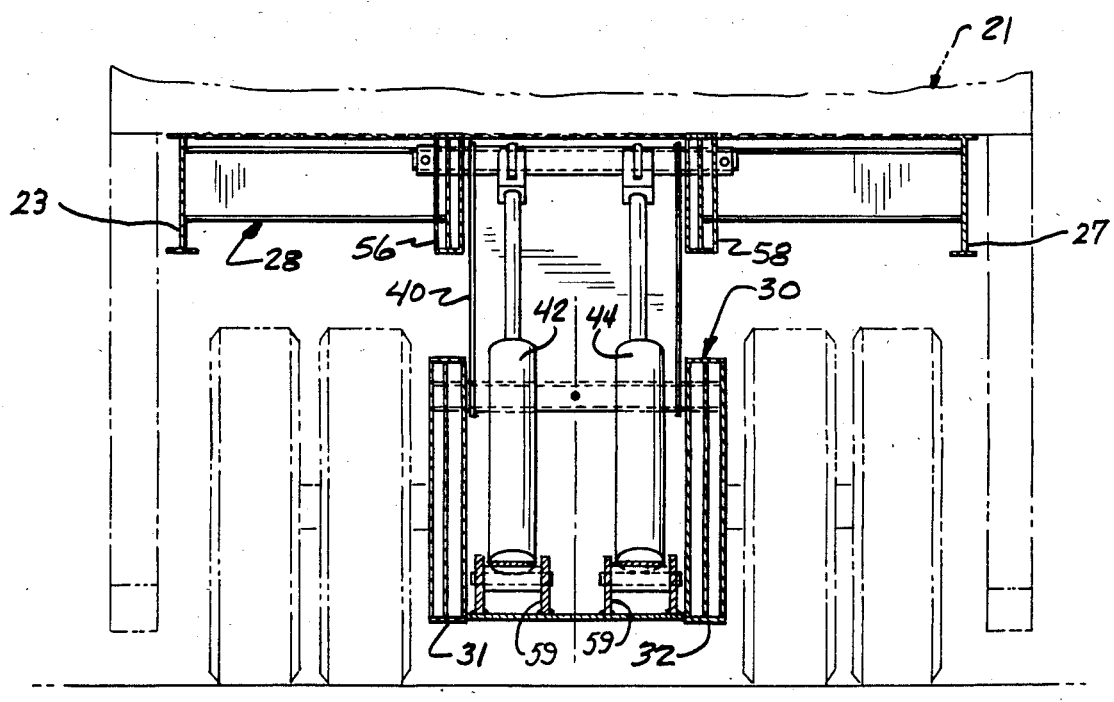
Figure 8:
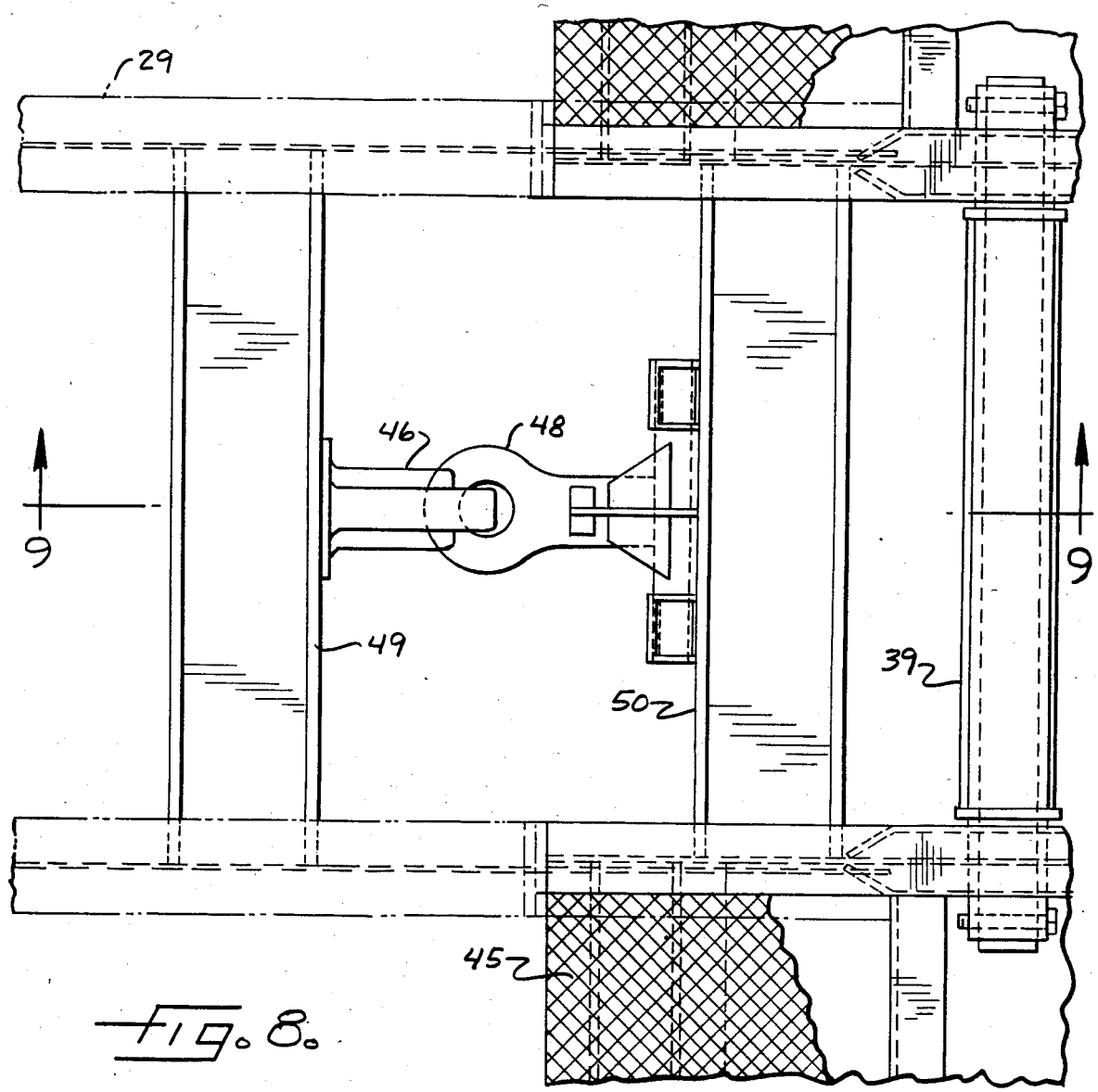
FIG. 8 is an enlarged fragmentary plan view illustrating the forward central portion of the lift bed in abutting engagement with the gooseneck, and with the transport lock engaged, in the plane of the line 8—8 in FIG. 2.
Figure 9:
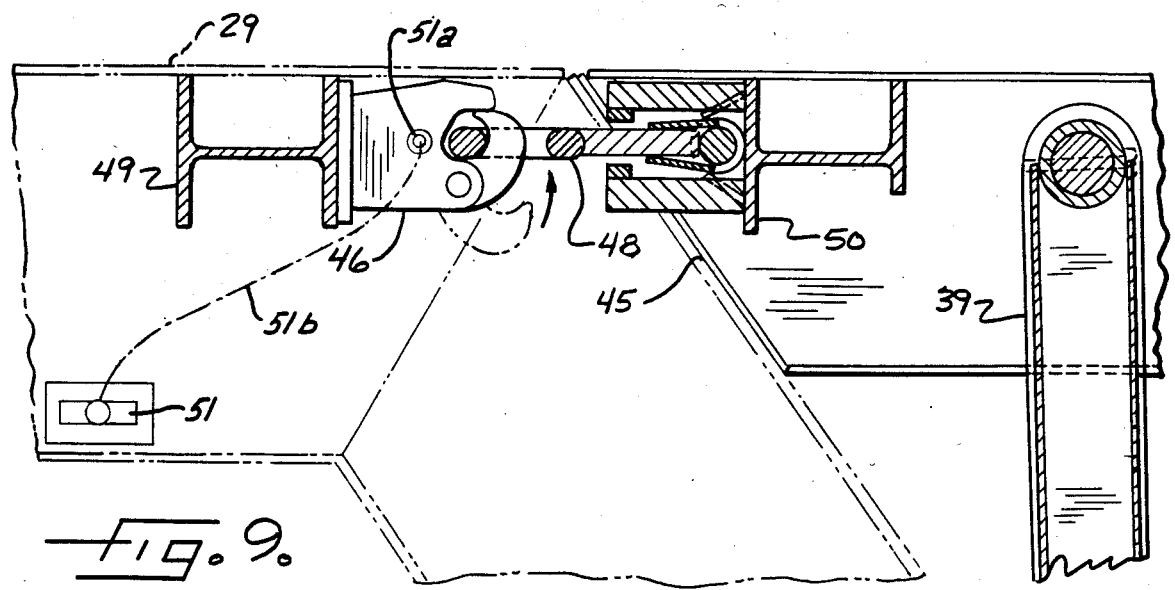
FIG. 9 is an enlarged fragmentary vertical sectional view taken through the transport lock and adjacent structure in the plane of line 9—9 in FIG. 8.
Figure 9A:
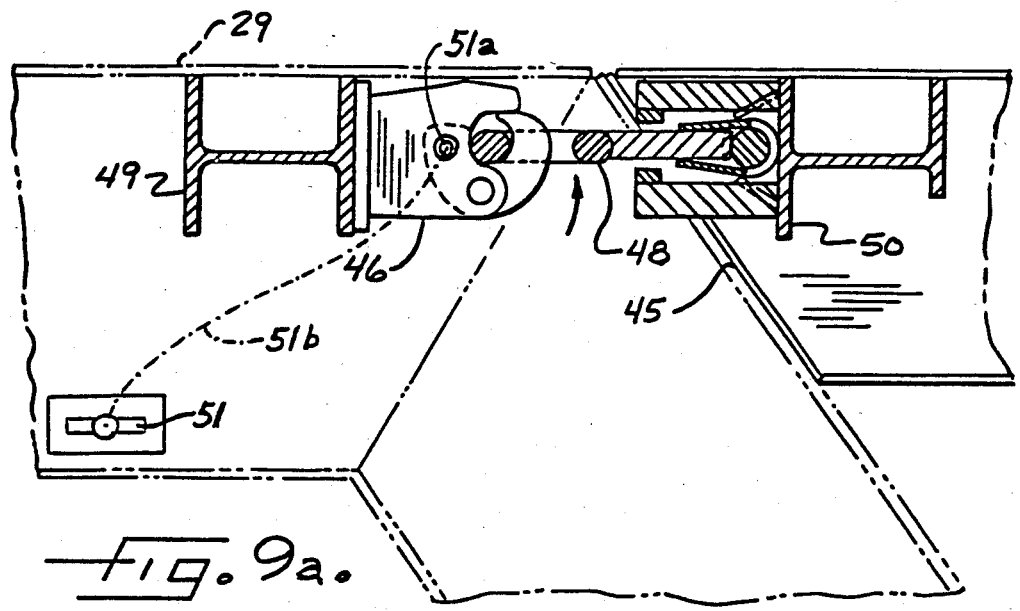
FIGS. 9a and 9b are enlarged fragmentary vertical sectional views similar to FIG. 9 and illustrating the manual cord release for the locking dog described below.
Figure 9B:
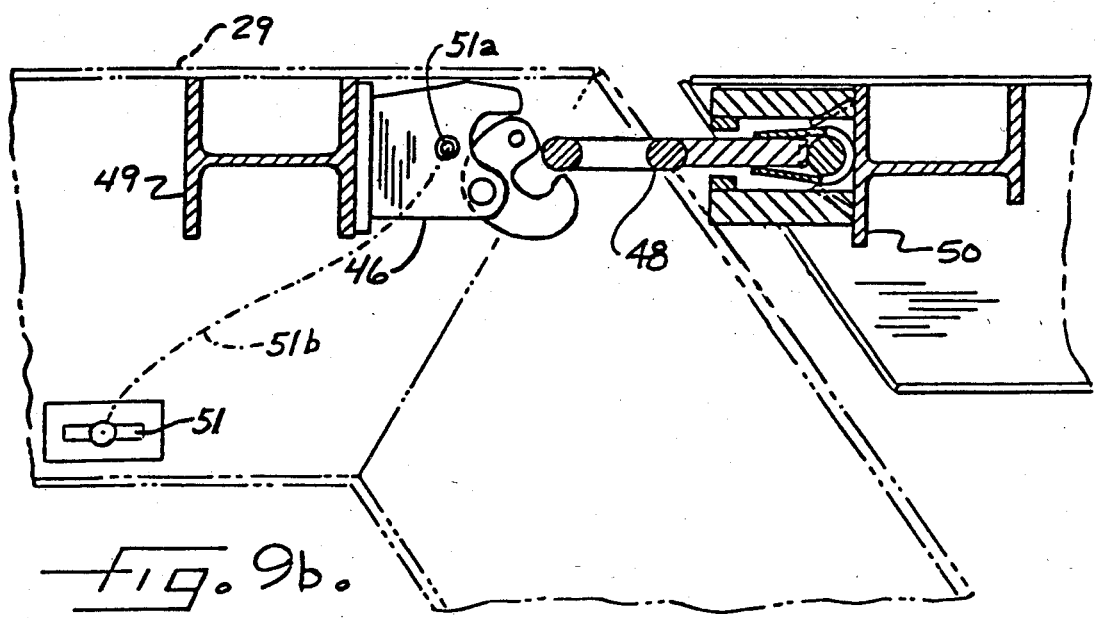

The mounting of the hydraulic lift actuators 42, 44 and the hinge panels 39–41 in the trailer 20 contributes to efficient operation as well as strength. Referring to FIGS. 1, 2, 4, 5 and 10, it will be noted that the hydraulic actuators are mounted at their lower ends on a pair of clevises 59 rigidly fixed to a box beam 60 spanning the deep web portion of the main frame stringers. The actuators are disposed in a forwardly inclined position with their piston rods disposed almost normal to the middle hinge panel 40 at the start of a lifting operation. This tends to maximize the lever arm defined by the hinge panel 40 throughout most of the lifting stroke. The hinge panels 39, 40 and 41 are securely journaled in reinforced areas of the main frame I-beam stringers 31, 32, and in similarly reinforced areas in the inboard I-beam stringers 56, 58 of the lift bed. The parts are so proportioned that the hinge panels travel slightly past their vertical dead center position when the lift bed is fully raised, thereby reducing back pressure on the hydraulic lifting actuators 42, 44.

We claim as our invention:

1. A tractor drawn lift bed highway trailer adapted for transporting loads on legged pallets, said trailer comprising, in combination:
    (a) a main frame including a gooseneck at its forward end and a wheeled suspension at its rearward end;
    (b) a lift bed mounted on said main frame in overlying relation with same and movable along a forwardly and upwardly inclined path between a lowered loading position and a raised transport position substantially at the crest of said inclined path;
    (c) a plurality of hinge panels disposed in the fore and aft axial plane of the trailer and pivotally connected between said main frame and said lift bed for constraining the latter to move along said inclined path and in substantially parallel relation to the frame;

(d) power lift means interposed between said main frame and said lift bed for raising and lowering same;

(e) means interposed between said gooseneck and said lift bed for locking same in raised transport position as an incident to arriving at said position; and (f) said locking means comprising a self-engaging pintle hook and eye mechansim.

2. The combination set forth in claim 1, wherein said pintle hook and eye mechanism is engagable in response to elevation of the lift bed to raised transport position and manually disengagable when in said position.

3. A tractor drawn lift bed highway trailer adapted for transporting loads on legged pallets, said trailer comprising the combination of:

(a) a main frame having a gooseneck at its forward end and a wheeled suspension at its rearward end;

(b) a lift bed mounted on said main frame in overlying relation with same and movable along a forwardly and upwardly inclined path between a lowered loading position and a raised transport position substantially at the crest of said inclined path;

(c) said lift bed including a pair of outboard stringers of structural beam configuration;

(d) power lift means interposed between said main frame and said lift bed for raising and lowering same;

(e) a pallet having a plurality of legs disposed in straddling relation on each side of said lift bed; and (f) means defining a pair of laterally and outwardly extending pallet stops on the forward end portion of said lift bed, each said pallet stop being fashioned in the form of an inverted right triangular prism mounted on the outer side of its associated lift bed stringer and having a vertical abutment normal to said stringer;

(g) said pallet stops being adapted to intercept the foremost pallet legs and thereby arrest forward sliding motion of said pallet in event of an emergency stop of said trailer.

4. A tractor drawn lift bed highway trailer adapted for transporting loads on legged pallets, said trailer comprising, in combination;

(a) a main frame including a gooseneck at its forward end and a wheeled suspension at its rearward end;

(b) a lift bed mounted on said main frame in overlying relation with same and movable between a lowered loading position and a raised transport position in which the top surface of said lift bed is substantially coplanar with the top surface of said gooseneck;

(c) a plurality of hinge panels disposed in the fore and aft axial plane of the trailer and pivotally connected between said main frame and said lift bed for constraining the latter to move along a forwardly and upwardly inclined path to said transport position substantially at the crest of said inclined path and in substantially parallel relation to the frame;

(d) power means interposed between said main frame and said lift bed for raising and lowering same;

(e) said lift bed having undercut areas on its forward end portion complemental to and adapted to enter into abutting engagement with said gooseneck when said lift bed is in raised transport position; and (f) self-engaging transport locking means interposed between said forward end portion of said lift bed and said gooseneck for maintaining said abutting areas in engagement with said gooseneck during transport, whereby the rigidity of said gooseneck and the adjacent portions of said lift bed, hinge panel, and main frame is enhanced during transport.

* * * * *